June 25, 1968 W. J. RACE 3,390,338

RECEIVER MOUNTING APPARATUS PERMITTING ADJUSTMENT OF CONTROL SHAFT POSITION

Filed Aug. 16, 1965 2 Sheets-Sheet 1

Inventor:-
William J. Race,
By Mueller, Aichele & Rauner Attys.

Inventor:-
William J. Race,
By Mueller, Aichele and Rauner
Attys.

United States Patent Office 3,390,338

Patented June 25, 1968

3,390,338

RECEIVER MOUNTING APPARATUS PERMITTING ADJUSTMENT OF CONTROL SHAFT POSITION

William J. Race, Franklin Park, Ill., assignor to Motorola, Inc., Franklin Park, Ill., a corporation of Illinois Filed Aug. 16, 1965, Ser. No. 480,066
6 Claims. (Cl. 325—352)

This invention relates to control apparatus, and more particularly to radio control apparatus which is adapted to be mounted in a variety of different supporting structures, such as the dashboards of automobiles, trucks, airplanes or the like.

Most auto radios are positioned behind the dashboard of a car with a pair of shafts for manual volume and tuning adjustment extending through apertures formed in the dashboard. Such radios generally incorporate a tuning dial which either projects through an opening in the dashboard between the shaft apertures, or is visible through such opening. Since many automobiles are sold with radio receivers already installed, substantially all cars manufactured are provided with a set of shaft apertures and a tuning dial opening in the dashboard. The relative positions of these apertures, however, varies somewhat between different makes and models of automobiles. For this reason, one who buys an auto without a radio and desires to have one installed subsequently must purchase a model in which the relative positions of the control shafts and dial thereon correspond to the apertures provided in the dashboard of his car. Manufacturers of auto radios must make different models to fit the various dashboard configurations and the provision of a substantial number of different models necessarily adds to overall manufacturing cost.

In order to avoid this problem and provide the possibility of manufacturing a single model radio which will fit all different dashboard aperture spacings, the universal mount automobile radio receiver has been developed. Such radios have a volume control shaft and a tuning control shaft which are adjustable in position relative to the radio receiver and the tuning dial. Such a radio receiver can easily be installed in a variety of different makes of automobiles or similar vehicles. Such universal mount radio receivers are shown and described in the patent to the present inventor, No. 2,953,927, patented Sept. 27, 1960, and in the patent to Winkler No. 3,073,171, patented Jan. 15, 1963. Both of the foregoing patents have been assigned to the assignee of the present invention. It has been found that solutions such as those proposed by the two foregoing patents, although satisfactory in many instances, do not afford the extremely wide variety of possible adjustments which may be necessary.

It is an object of this invention to provide control apparatus for a universal mount radio receiver which provides for a wide variety of control shaft position adjustment.

Another object of the invention is to provide control apparatus for a universal mount radio receiver wherein the provision for vertical displacement of a pair of control shafts with respect to the tuning dial is improved.

A feature of the invention is the provision, in control apparatus, of a front panel having a pair of apertures with portions permitting vertical displacement of a pair of control shafts with respect to a dial while maintaining a given horizontal spacing of the control shafts with respect to each other and the dial.

Another feature of the invention is the provision, in control apparatus, of a front panel with a pair of apertures therein each comprised of a plurality of elongated contiguous slots, at least one of which slots extends substantially vertically with respect to a dial.

Still another feature of the invention is the provision, in control apparatus, of a front panel having a pair of apertures therein of a size accommodating a variety of possible positions of a pair of control shafts, and of a pair of plates secured to the front panel covering the respective apertures and each having a smaller mounting aperture therein in a predetermined position.

Figures 2, 3A, 3B, 3C:
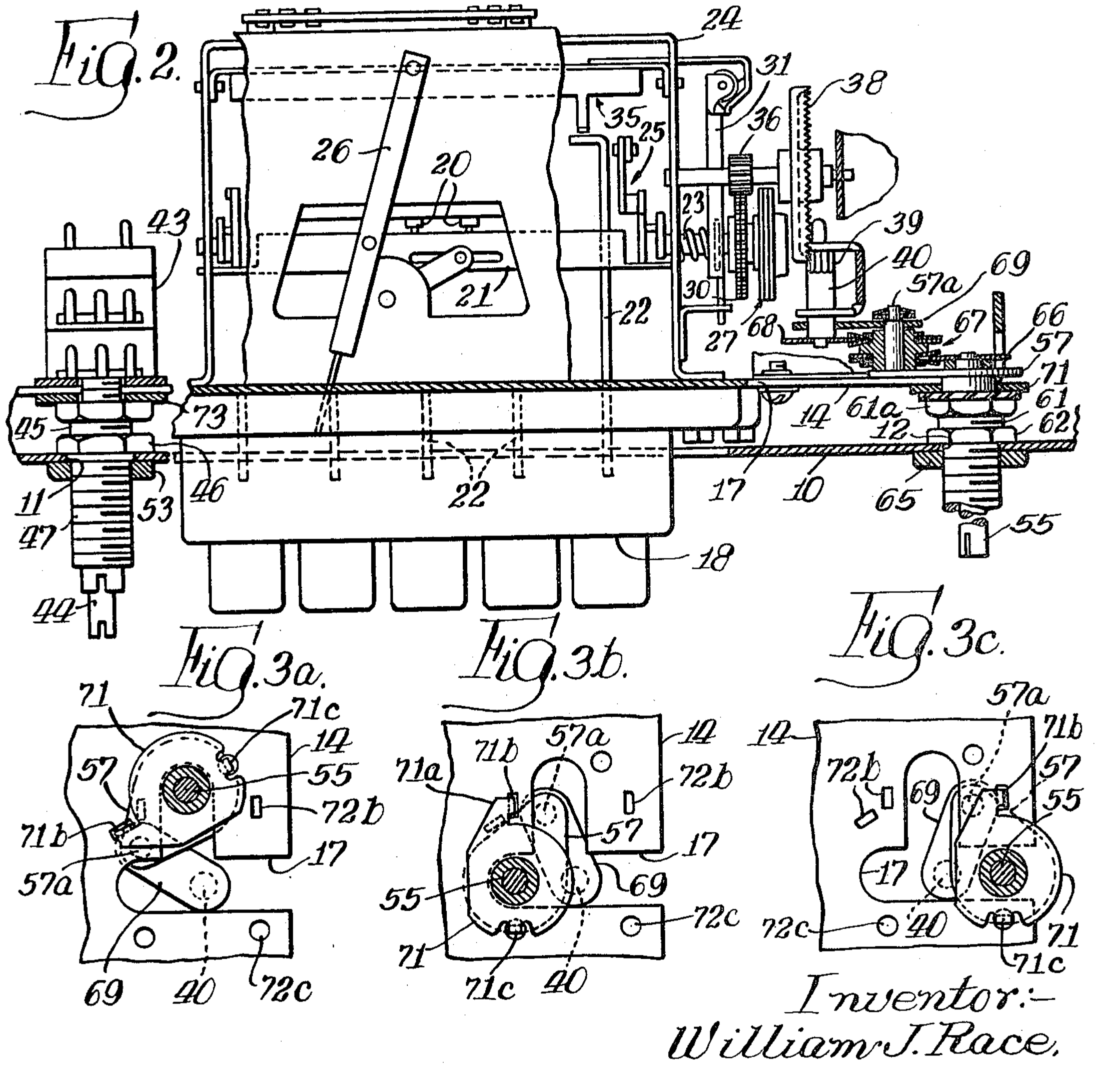
FIG. 2 is a plan view of a radio receiver control apparatus in accordance with the present invention.
Figure 4:
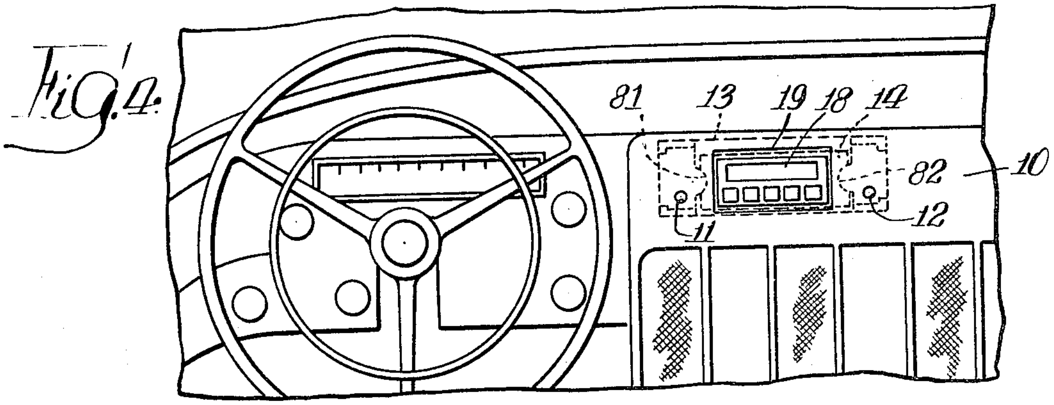
Figures 5, 6:
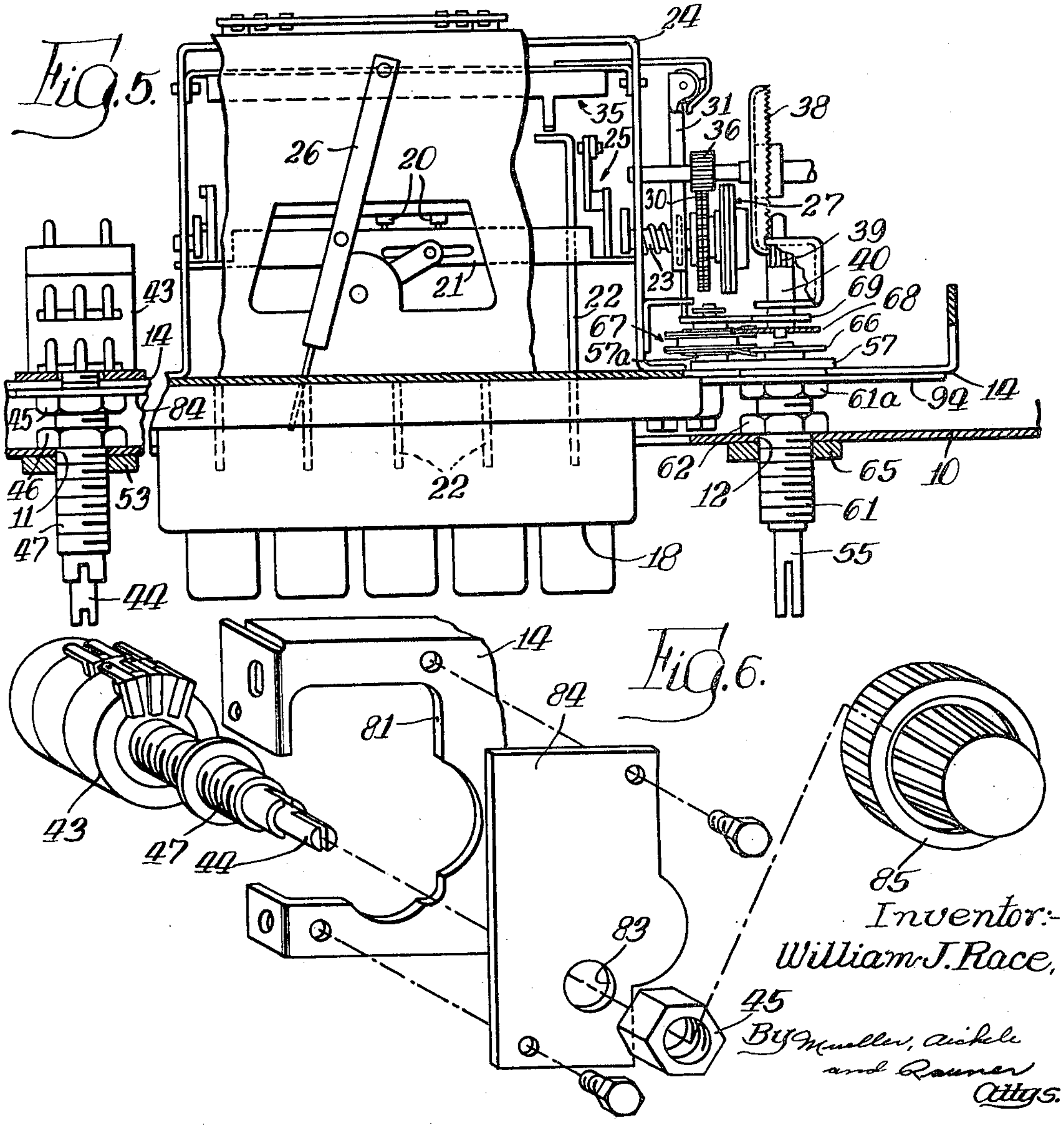

FIGS. 3*a*, 3*b* and 3*c* are front views of various mounting positions of a control shaft of FIG. 2;

FIG. 4 is a view illustrating the mounting of a radio receiver having control apparatus in accordance with another embodiment of the invention;

FIG. 5 is a plan view of the radio receiver control apparatus illustrated in FIG. 4; and FIG. 6 is an exploded view of a portion of the control apparatus of FIGS. 4 and 5.

To summarize the invention as shown, control apparatus for a universal mount automobile radio receiver includes a pair of control shafts having substantially parallel axes. A front panel, having a dial fixed thereon, has a pair of apertures therein, one on each side of the dial. The apertures are of a shape to accommodate displacement of the control shafts relative to the dial. The apertures have a portion permitting vertical displacement of the control shafts with respect to the dial while maintaining a given spacing of the control shafts with respect to each other and the dial. Means are connected to the front panel for supporting each of the control shafts in a respective one of the apertures at a given position with respect to each other and the dial. In one form of the invention the apertures are comprised of a plurality of elongated contiguous slots at least one of which extends substantially vertically with respect to the dial of the tuning device. In another form of the invention the apertures are of a size sufficient to accommodate a variety of possible positions of the control shafts and a pair of plates are secured to the front panel covering respective ones of the apertures. Each plate has a smaller mounting aperture therein in a predetermined position for mounting one of the control shafts.

Figure 1:
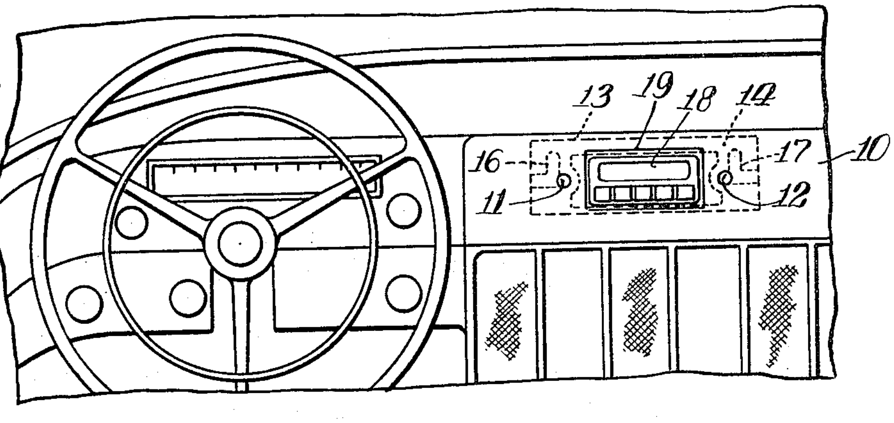
FIG. 1 is a view illustrating the mounting of a radio receiver behind the dashboard of a typical automobile.

FIG. 1 shows a typical automobile dashboard 10 with spaced openings 11 and 12 formed therein to accommodate manual control shafts for radio receiver 13. The front panel 14 of the receiver 13 is provided with a pair of apertures 16 and 17, one of which is illustrated in detail in FIG. 3. Apertures 16, 17 are of a configuration comprising a pair of contiguous elongated slots, one horizontally oriented, and one vertically oriented. The result is a shape resembling an inverted T. The receiver 13 also includes a tuning dial 18, which protrudes through an opening 19 in the dashboard 10. The spacing between openings 11 and 12 and the positioning of openings 11 and 12 with respect to opening 19 will vary among the different makes of cars.

As shown in FIG. 2, the tuning device includes a plurality of adjustable tuning cores 20 operatively connected to a carriage 21 which may be reciprocated in order to position the cores 20 for tuning purposes. The carriage 21 may be properly positioned for selected channels by operation of sliding push-button rods. Since suitable mechanism for this operation is known, this portion of the apparatus is not illustrated. An indicator arm 26 is driven by the carriage 21 in order to indicate, on dial 18, the frequency to which the tuner is adjusted.

The carriage 21 may also be driven for tuning purposes through linking mechanism 25 by rotation of the shaft 23, which is journaled in the tuner frame 24. Shaft 23 is driven through a clutch 27 by a drive train comprised of gears 30, 36, 38, 39, discs 66 and 68, and pinch washer assembly 67. The details of this mechanism for driving the tuner are set forth more fully in the Winkler patent previously cited and will not, therefore, be detailed here. The clutch 27 is disengaged upon depression of one of pushbutton rods 22 to prevent the drive train inertia from resisting depression of the pushbutton. This is accomplished by a declutching mechanism comprised of lever 31 and lever actuator 35. Such declutching mechanism is also described more fully in the Winkler patent.

It will be understood that the present invention has equal application to tuners in which only rotational manual tuning is provided and that the pushbutton structure is shown merely as an example of one form of receiver in which the invention may be utilized.

It will be noted that shaft 40, which carries gear 39 and disc 68, extends perpendicularly to the front plate 14 and could thus be extended to project outwardly of the receiver so that it could be manually rotated by means of a suitable knob mounted thereon. A problem would be encountered, however, when the receiver is mounted to a dashboard 10 in which the aperture through which the shaft 40 would extend is not properly spaced from the aperture 11 in the dashboard 10 through which the shaft of volume control 43 would extend. The volume control 43 includes a control shaft 44 which extends outwardly of the dashboard 10 and to which a control knob may be affixed. The control 43 is mounted in opening 16 in front plate 14 by means of a nut 45 which is threaded on the bushing 47 of the control. The precise mounting arrangement will be explained in detail subsequently. A threaded portion of the bushing 47 extends through the aperture 11 of the dashboard 10 and a suitable nut 53 is threaded thereon to form one mounting point for the entire receiver 13.

Since it is generally desirable from the standpoint of good appearance to have the pushbutton rods 22 and the dial 18 centered between the control shafts 44 and 55, it is necessary to permit adjustable positioning of the mechanical control mechanism for the tuner of the receiver. A control shaft 55 is mounted in a bushing 61 which includes an arm 57 and a threaded portion projecting through the opening 17. The bushing 61 includes a shoulder which bears against the inner surface of the dashboard 10 and a fastening nut 65 may be threaded upon the bushing 61 to mount the entire assembly with respect to the dashboard 10. It can be seen that the mounting of the receiver 13 to the dashboard 10 is effected through fastening both the volume control bushing 47 and the tuning control bushing 61.

Drive disc 66 is fixed to the inward end of the shaft 55 and a portion of the periphery of this disc is captured on one side of the pinchwasher assembly 67. The assembly 67 is rotatably mounted on a stud **57*a* of the bushing arm 57. A second portion of the pinch washer assembly is in driving engagement with the disc 68 which is fixed to one end of the shaft 40. A link 69 is joined between the shaft 40 and the stud 57*a* in order to maintain proper spacing between these members and to maintain the disc 68 captured by the pinch washer assembly 67. Accordingly, it may be seen that manual rotation of shaft 55 will turn disc 66 causing rotation of the pinch washer assembly and driving of the disc 68. Disc 68 will, of course, drive the shaft 40 and the drive train for shaft 23 to tune the receiver. Because link 69 permits the pinch washer assembly 67 to move about the axis of shaft 40, and because arm 57 will allow the bushing 61 to be moved about the axis of shaft 40 when nut 65 is loosened, the tuner control shaft 55 may be moved to various positions while a driving connection is still afforded to the tuner shaft 23**.

The adjustments of the tuner control shaft 55 and the volume control shaft 44 to precise positions on the front plate are made in basically the same way and so only the shaft 55 is shown in FIG. 3. The front panel 14 of the tuner mechanism of the receiver is, as has been stated before, provided with a pair of apertures 16 and 17, one on each side of the opening for dial 18. The apertures are comprised of a pair of elongated contiguous slots in roughly perpendicular relationship. The formation shown is that of an inverted T. The vertical portions of the T apertures are aligned on the most common center distance in the various auto models and permit adjustment of the control shafts 44 and 55 vertically with respect to the orientation of dial 18. This is in addition to the horizontal adjustment provided by the horizontal slot. This vertical adjustment may be made without varying the spacing between the shafts and their horizontal spacing from the dial 18.

The control shafts are mounted to the front panel 14 of the tuner by means of a mounting plate large enough to cover the aperture and having a smaller opening therein. Control shaft 55 and bushing 61 extend through a hole in plate or washer 71. Plate 71 has an extension **71*a* thereon which is provided with a small tab 71*b* projecting at a right angle from plate 71. A further tab 71*c* is also provided on the main portion of plate 71. A plurality of openings 72*b* are provided for tabs 71*b* and a plurality of openings 72*c* are provided for tabs 71*c*. These openings, when the corresponding tabs are inserted therein, orient the plate 71 in a given position. As a result, the tuning shaft 55 is also oriented in a desired position by proper placement of the positions of openings 72*b*, 72*c*** according to the various makes of automobiles. FIGS. 3*a*, 3*b* and 3*c* illustrate three possible positions in which the plate 71 may be oriented. Thus, by mounting plate 71 to the front panel 14 of the tuning device, the tuning shaft 55 may be properly positioned for a particular spacing of openings 11 and 12. Bushing nut **61*a* clamps the plate 71 against the front panel 14. Volume control shaft 44 is positioned in a similar manner with plate 73 being similar to plate 71**.

Referring now to FIGS. 4, 5 and 6, a further embodiment of the invention is shown. Identical parts have been given identical numbers. In the embodiment of FIG. 4, the front plate or panel 14 of the tuning device is provided with apertures, at either side of the dial 18, which are of a size accommodating all the possible variations of control shaft position. These apertures 81 and 82 have a portion permitting vertical displacement of the control shafts with respect to the dial 18 while maintaining a given spacing of the control shafts with respect to each other and the dial. The precise location of the control shaft in each aperture is determined by the positioning of an opening in a plate which is secured to the front panel over the aperture.

Referring particularly to FIG. 6, the positioning of the volume control shaft 44 in the aperture 81 is determined by the positioning of the opening 83 in the cover plate 84. Plate 84 is secured to the front panel 14 of the tuning device over the aperture 81 by threaded fasteners. The shaft 44 is then secured in opening 83 by means of the conventional bushing and lock nut arrangement comprised of bushing 47 and nut 45 and a knob 85 is placed on the end of shaft 44. A similar plate 94 is secured over aperture 82 on the side of shaft 55 (see FIG. 5). Such a construction enables a radio dealer to keep a number of different ones of the plates, such as plate 84, with openings 83 provided in different positions according to various makes of automobiles. A given radio is then provided with the proper plates and the desired spacing is achieved. Such an arrangement permits the control shafts to be positioned with an infinite variety of spacings.

It may, therefore, be seen that the invention provides improved control apparatus in a universal mount automobile radio receiver. The apparatus is simple of construction and permits considerable flexibility in vertical displacement of the control shafts.

I claim:

1. Control apparatus for a universal mount radio receiver, including in combination, a pair of control shafts having substantially parallel axes, a front panel having a dial fixed thereon and further having a pair of apertures therein, said apertures being on opposite sides of said dial, said apertures being shaped to accommodate displacement of respective ones of said control shafts relative to said dial and having portions permitting vertical displacement of said control shafts with respect to said dial while maintaining a given horizontal spacing of said control shafts with respect to each other and said dial, and means connected to said front panel for supporting each of said control shafts in a respective one of said apertures at a given position with respect to the other and said dial.

2. Control apparatus for a universal mount radio receiver, including in combination, a pair of control shafts having substantially parallel axes, a front panel having a dial fixed thereon and further having a pair of apertures therein, said apertures being on opposite sides of said dial, said apertures being shaped to accommodate displacement of respective ones of said control shafts relative to said dial and having portions permitting vertical displacement of said control shafts with respect to said dial while maintaining a given horizontal spacing of said control shafts with respect to each other and said dial, a pair of plates, each being engageable with said front panel and disposed over a respective one of said apertures, each of said plates having an opening therethrough, and means supporting each of said control shafts in a respective one of said openings at a given position with respect to the other and said dial.

3. Control apparatus for a universal mounting radio receiver, including in combination, a pair of control shafts having substantially parallel axes, a front panel having a dial fixed thereon and further having a pair of apertures therein, said apertures being on opposite sides of said dial, said apertures being shaped to accommodate displacement of respective ones of said control shafts relative to said dial and having portions permitting vertical displacement of said control shafts with respect to said dial while maintaining a given horizontal spacing of said control shafts with respect to each other and said dial, a pair of plates, each having means thereon engaging said front panel and positioning said plate in a given position over a respective one of said apertures, each of said plates having an opening therethrough, and means supporting each of said control shafts in a respective one of said openings at a given position with respect to the other and said dial.

4. Control apparatus for a universal mount radio receiver, including in combination, a pair of control shafts having substantially parallel axes, a front panel having a dial fixed thereon and further having a pair of apertures therein, said apertures being on opposite sides of said dial and each being comprised of a plurality of elongated contiguous slots at least one of which extends substantially vertically with respect to the dial of the tuning device, said apertures accommodating displacement of said control shafts relative to said dial with said vertical slots permitting vertical displacement of said control shafts with respect to said dial while maintaining a given horizontal spacing of said control shafts with respect to each other and said dial, and means connected to said front panel for supporting each of said control shafts in a respective one of said apertures at a given position with respect to the other and said dial.

5. Control apparatus for a universial mount radio receiver, including in combination, a pair of control shafts having substantially parallel axes, a front panel having a dial fixed thereon and further having a pair of apertures therein, said apertures being on opposite sides of said dial, each of said apertures being comprised of a plurality of elongated contiguous slots, at least one of which extends substantially vertically with respect to the orientation of said dial, said slots accommodating displacement of said control shaft relative to said dial with said vertically extending slots permitting vertical displacement of said control shafts with respect to said dial while maintaining a given horizontal spacing of said control shafts with respect to each other and said dial, a pair of plates, each having means thereon engaging said front panel and positioning said plate in a given position over a respective one of said apertures, each of said plates having an opening therethrough, and means supporting each of said control shafts in a respective one of said openings at a given position with respect to the other and said dial.

6. Control apparatus for a universal mount automobile radio receiver, including in combination, a pair of control shafts having substantially parallel axes, a front panel having a dial fixed thereon and further having a pair of apertures therein, said apertures being on opposite sides of said dial, each of said apertures being of a size accommodating a variety of possible vertical and horizontal positions of a respective one of said control shafts relative to said dial, said apertures having portions permitting vertical displacement of said control shafts with respect to said dial while maintaining a given spacing of said control shafts with respect to each other and said dial, a pair of plates, each being secured to said front panel over a respective one of said apertures in a predetermined orientation and having a mounting opening therein in a given position, and means supporting each of said control shafts in a respective one of said openings at a given position with respect to the other and said dial.

References Cited

UNITED STATES PATENTS 2,750,494 6/1956 Marholz ............ 325—312

KATHLEEN H. CLAFFY, *Primary Examiner.*

R. S. BELL, *Assistant Examiner.*